(12) United States Patent
Chisholm et al.

(10) Patent No.: US 6,613,140 B2
(45) Date of Patent: Sep. 2, 2003

(54) AZO ORANGE PIGMENT COMPOSITION

(75) Inventors: Greig Chisholm, Glasgow (GB); Sharon Kathleen Wilson, Amsterdam (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/954,237

(22) Filed: Sep. 17, 2001

(65) Prior Publication Data

US 2002/0096086 A1 Jul. 25, 2002

(51) Int. Cl.$^7$ .............................................. C09B 63/00
(52) U.S. Cl. ...................... 106/496; 106/31.8; 106/493; 106/494; 106/495; 430/7; 430/45; 430/108.23; 430/114; 430/511
(58) Field of Search ................................ 106/493, 494, 106/495, 496, 31.8; 430/7, 45, 108.23, 114, 511; 523/161

(56) References Cited

U.S. PATENT DOCUMENTS

| | | | |
|---|---|---|---|
| 2,694,055 A | | 11/1954 | Ludwig et al. ............. 260/151 |
| 4,083,687 A | | 4/1978 | Pugin et al. ...................... 8/42 |
| 5,837,761 A | * | 11/1998 | MacPherson et al. ....... 106/241 |
| 5,997,628 A | * | 12/1999 | Bindra ....................... 106/31.5 |
| 6,294,012 B1 | * | 9/2001 | Bindra ..................... 106/31.78 |
| 6,387,170 B1 | * | 5/2002 | Gray et al. .............. 106/31.77 |
| 6,402,828 B1 | * | 6/2002 | Chisholm et al. ........... 106/493 |

FOREIGN PATENT DOCUMENTS

| | | | |
|---|---|---|---|
| EP | 0767219 | | 4/1997 |
| WO | 00/26303 | * | 5/2000 |

OTHER PUBLICATIONS

Patent Abstracts of Japan Publication No. 03097762 (Apr. 1991).
Chem. Abstr. vol. 66, No. 22, 96276f, for Nagoya Kogya Gijutsu Shikensho Hokoku vol. 14, pp. 286–290 (1965) (no month).
Chem. Abstr. 115:73622g for JP 0350269 (Apr. 1991).

* cited by examiner

*Primary Examiner*—Anthony J. Green
(74) *Attorney, Agent, or Firm*—David R. Crichton

(57) ABSTRACT

The present invention relates to a composition comprising at least one azo pigment of the formula

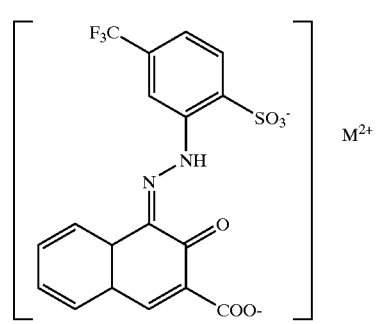

optionally additional azo pigments and a surfactant, and from 0.1 to 50% by weight of a selected resin. The invention further relates to a process for its preparation, its use for the preparation of dispersions, paint systems, coating materials, color filters, inks, preferably printing inks, as well as color toners comprising the inventive pigment compositions, particularly preferable as liquid inks in the packaging industry, and liquid inks for the packaging industry.

13 Claims, No Drawings

AZO ORANGE PIGMENT COMPOSITION

The present invention relates to a composition comprising (a) from 80 to 99.9% by weight of an azo pigment I

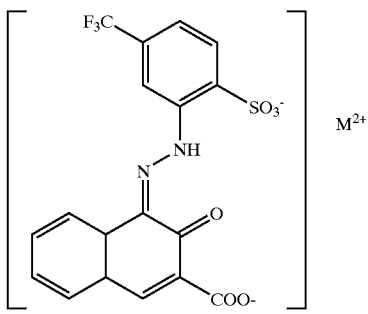

where M is Mg, Ca, Sr, Ba, or Mn or a mixture thereof, (b) from 0 to 20% by weight of an azo pigment II

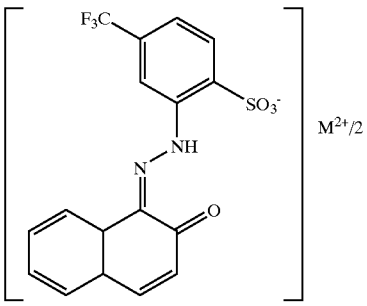

(c) from 0 to 20% by weight of an azo pigment III

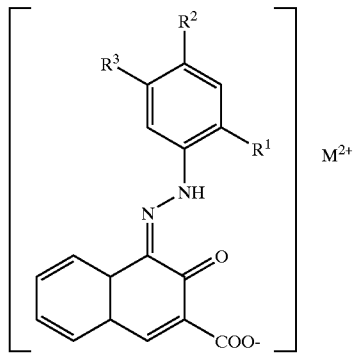

where $R^1$, $R^2$ and $R^3$ independently from each other stand for hydrogen, $C_1$–$C_{20}$-alkyl, $C_5$–$C_{20}$-alkoxy, $C_2$–$C_{20}$-alkenyl, $C_1$–$C_{20}$-alkylthiol, $C_1$–$C_{20}$-alkoxycarbonyl, hydroxy-$C_1$–$C_4$-alkoxy, phenyl, benzyl, phenylthio, halogen, such as fluoro, chloro, bromo, iodo, cyano, nitro, —$CF_3$, —$COR^4$, —$COOR^5$, —$CONR^4R^5$, —$SO_2R^4$, —$SO_2NR^4R^5$, —$NR^4R^5$ or —$OR^4$, with the proviso, that—in formula III—when $R^2$ stands for hydrogen and $R^3$ is $CF_3$, then $R^1$ is not —$SO_3$, and wherein $R^4$ and $R^5$ independently from each other stand for hydrogen, $C_1$–$C_4$-alkyl or phenyl, with the proviso, that at least one of the groups $R^1$, $R^2$ or $R^3$ is not hydrogen, preferably wherein $R^1$ is —COOH or —$SO_3H$, (d) from 0 to 20% by weight of an azo pigment IV

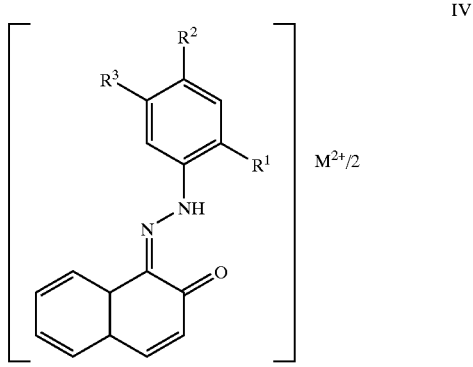

(e) from 0 to 20, preferably 0.1 to 20% by weight, based on the sum of the amounts of components (a) to (d), of a surfactant, from 0.1 to 50% by weight, based on the sum of the amounts of components (a) to (d), of a resin selected from the group consisting of tall oil resin, gum rosin, wood rosin, hydrogenated rosin, rosin ester, dispropor-tionated rosin, dimerised rosin, polymerised rosin, phenolic rosin and carboxyl containing maleic and fumaric resin.

Liquid inks are used mainly in the packaging industry where they are applied to a wide variety of substrates including paper, board, foil and polyethylene. Furthermore, such inks are also widely used in the printing of stationary materials, tickets, and comic books as well as other media.

There are a number of properties which are critical to the performance of an ink designed for use in these systems. Whereas many of these properties are common with other inks, e.g. viscosity, colour strength, adhesion and transfer. They differ from the common lithographic inks in that they generally are free-flowing. This is mainly due to the nature of the printing process employed to deposit them. Usually the ink is continuously pumped into a duct where an overflow ensures that the volume of ink within the duct stays constant. The recovered ink from the overflow is then reintroduced into the duct by pumping and gravity fall. Such a process usually depends on a fluid state for the ink. Fluidity is also important in the action of ink rollers. In order to obtain a desired fluidity for a poorly flowing pigment it is necessary to add further solvent to the ink. This can have the effect of lowering the colour strength as well as decreasing the film weight of the printed film.

EP-A 767 219 describes plastic compositions comprising a high molecular weight material and an azo pigment of formula V

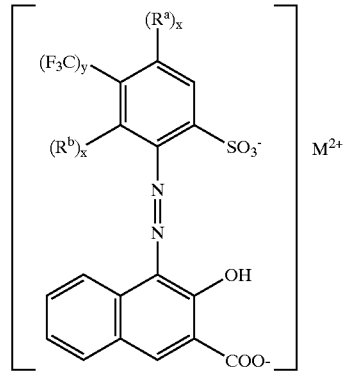

where M is Mg, Ca, Sr, Ba or Mn or a mixture of two or more thereof, $R^a$ and $R^b$ are chlorine or methyl, x is zero or 1, y is zero or 1 and the sum of x and y is 1 with the proviso that when the high molecular weight material is polyvinyl chloride y is zero. However, no pointer is given of how the compounds of formula V or mixtures thereof can be used in liquid ink applications. In particular, no hint is given of how to increase gloss of an ink film and fluidity of an ink.

Therefore, the object of this invention was to provide a novel composition, its use in liquid inks, especially for use in the packaging industry, a process for its preparation and liquid inks. Particularly, the liquid inks should have a superior fluidity, and should exhibit an improved gloss. In addition, the pigment compositions preferably should be chlorine-free.

Accordingly, the above described compositions were found. In addition, a process for their preparation, their use and liquid inks, especially for their use in the packaging industry, have been found, too.

$C_1$–$C_{20}$-alkyl stands for methyl, ethyl, n-, i-propyl, n-, i-, sec.-, tert.-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, preferably $C_1$–$C_4$alkyl such as methyl, ethyl, n-, i-propyl, n-, i-, sec.-, tert.-butyl;

$C_5$–$C_{20}$alkoxy stands for n-pentoxy, n-hexoxy, n-heptoxy, n-octoxy, n-nonoxy, n-decoxy, n-undecoxy, n-dodecoxy, n-tridecoxy, n-tetradecoxy, n-pentadecoxy, n-hexadecoxy, n-heptadecoxy, n-octadecoxy, n-nonadecoxy, n-eicosoxy;

$C_2$–$C_{20}$alkenyl stands for ethenyl, n-, i-propenyl, n-, i-, sec.-, tert.-butenyl, n-pentenyl, n-hexenyl, n-heptenyl, n-octenyl, n-nonenyl, n-decenyl, n-undecenyl, n-dodecenyl, n-tridecenyl, n-tetradecenyl, n-pentadecenyl, n-hexadecenyl, n-heptadecenyl, n-octadecenyl, n-nonadecenyl, n-eicosenyl $C_1$–$C_{20}$alkylthiol stands for methylthio, ethylthio, n-, i-propylthio, n-, i-, sec.-, tert.-butylthio, n-pentylthio, n-hexylthio, n-heptylthio, n-octylthio, n-nonylthio, n-decylthio, n-undecylthio, n-dodecylthio, n-tridecylthio, n-tetradecylthio, n-pentadecylthio, n-hexadecylthio, n-heptadecylthio, n-octadecylthio, n-nonadecylthio, n-eicosylthio;

$C_1$–$C_{20}$alkoxycarbonyl stands for methoxycarbonyl, ethoxycarbonyl, n-, i-propoxycarbonyl, n-, i-, sec.-, tert.-butoxycarbonyl, n-pentoxycarbonyl, n-hexoxycarbonyl, n-heptoxycarbonyl, n-octoxycarbonyl, n-nonoxycarbonyl, n-decoxycarbonyl, n-undecoxycarbonyl, n-dodecoxycarbonyl, n-tridecoxycarbonyl, n-tetradecoxycarbonyl, n-pentadecoxycarbonyl, n-hexadecoxycarbonyl, n-heptadecoxycarbonyl, n-octadecoxycarbonyl, n-nonadecoxycarbonyl, n-eicosoxycarbonyl; hydroxy$C_1$–$C_4$alkoxy stands for hydroxymethoxy, hydroxyethoxy, hydroxy-n-, -i-propoxy, hydroxy-n-, -i-, -sec.-, -tert.-butoxy;

—$COR^4$ preferably may be —COMe,

—$COOR^5$ preferably may be —COOH,

—$CONR^4R^5$ preferably may be —$CONMe_2$,

—$SO_2R^4$ preferably may be —$SO_2Me$,

—$SO_3R^4$ preferably may be —$SO_3H$, resp. —$SO_3^-$,

—$SO_2NR^4R^5$ preferably may be —$SO_2NMe_2$,

—$NR^4R^5$ preferably may be —$NMe_2$.

Preferably $R^1$ is —COOH, and $R^2$=$R^3$=hydrogen, or $R^1$ is —$SO_3H$, $R^2$ is $C_1$–$C_4$alkyl, preferably methyl, and $R^3$ can be halogen, preferably chloro.

Preferred embodiments of this invention are the following compositions which may comprise one of the resins and/or surfactants described below:

(A) preferably in an amount of 90 to 100% by weight,

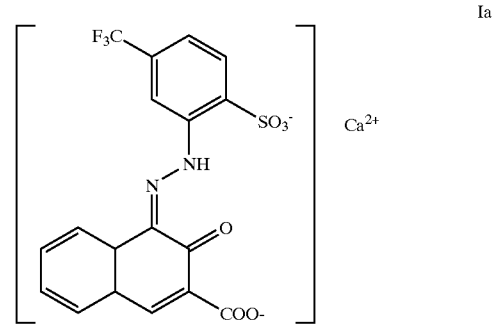

Ia (B) preferably in an amount of 0 to 10% by weight, compound Ia and

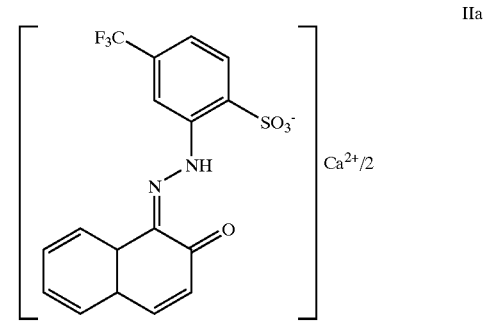

IIa (C) preferably in amounts of 0 to 10% by weight, compounds Ia and IIa and

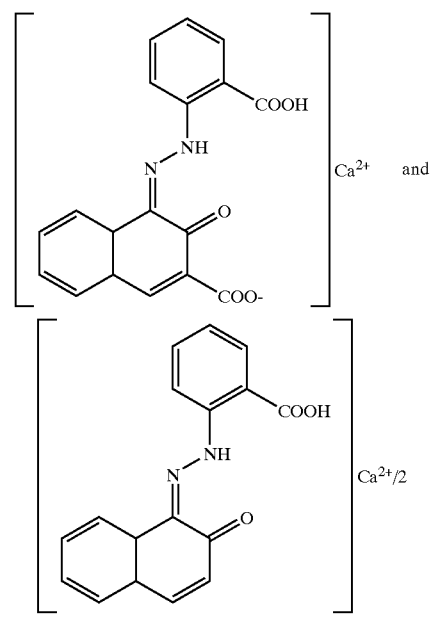

and (D) preferably in amounts of 0 to 10% by weight, compounds Ia and IIa and

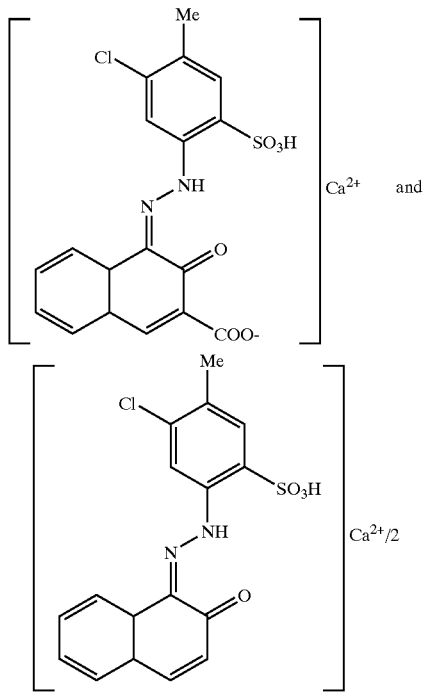

where the sum of the components amount to 100% by weight.

As surfactants anionic, cationic, amphoteric or non-ionic surfactants can be chosen. Anionic surfactants are e.g. alkyl-, aryl- or aralkyl sulphates or sulphonates; alkyl-, aryl- or aralkyl phosphates or phosphonates; or carboxylic acids. Cationic surfactants which may be used are e.g. primary, secondary or tertiary amines or quaternary salts of amines, e.g. tallow trimethyl ammonium chloride. Non-ionic surfactants which are suitable for use include e.g. long chain alcohols, alcohol or amine/ethylene oxide condensates, amine oxides or phosphine oxides and castor oil derivatives. Amphoteric surfactants are e.g. betaines, glycinates, or propionates.

Surfactants are well-known in the art, e.g. from Surfactants Europa, Ed. Gordon L. Hellis, $3^{rd}$ edition, 1995, Royal Society of Chemistry, London.

The inventive compositions may be prepared by laking, with a magnesium, calcium, strontium, barium or maganese salt or a mixture of two or more of such salts, (a) an azo dyestuff obtainable by coupling a diazonium salt of an amine of formula VI

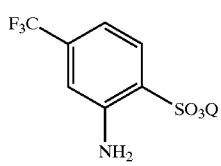

where Q is hydrogen, an alkali metal or ammonium, or (b) a mixture of azo dyestuffs obtainable by coupling a mixture of the diazonium salt VI and a diazonium salt VII

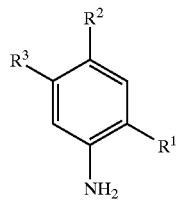

with 2-hydroxy-3-naphthoic acid (BONA) or a mixture of BONA and 2-hydroxynaphthalene.

Examples of salts which can be used to effect laking are the chlorides, sulphates, nitrates, formates and acetates of magnesium, calcium, strontium, barium and manganese and mixtures of two or more thereof. These laking metal salts may be added to the preformed azo dyestuff or mixture of azo dyestuffs, i.e. after the coupling reaction, or they may be included in the coupling reaction mixture, prior to coupling, together with the 2-hydroxy-3-naphthoic acid coupling component or, more usually, together with the diazonium salt or salts.

The coupling and laking reactions may be carried out using known procedures such as described in Industrial Organic Pigments, $2^{nd}$ edition, VCH, Weinheim, 1995, e.g. p. 604 to 606.

In carrying out the coupling reaction, a solution or suspension of the diazonium salt may be added to a solution or suspension of the coupling component, or the coupling component solution or suspension may be added to the diazonium salt solution or suspension, or both diazonium salt solution or suspension and coupling component solution or suspension may be added simultaneously to water, to an aqueous buffer or to an aqueous solution of the metal salt used to effect laking.

The pH of the coupling reaction mixture is preferably maintained at from 9 to 12. The surfactant and/or the resin can be added together or separately before or after coupling to the coupling or diazotisation component vessel.

In a preferred embodiment of this invention to a mixture of 2-amino-4-trifluoromethylbenzene-sulphonic acid, water and an aqueous sodium hydroxide solution is cooled to a temperature from 0 to 5° C., the bulk of an aqueous solution of sodium nitrite is added. Then, a hydrochloride acid solution is added. The diazotisation reaction is then continued by portionwise addition of the remainder of the sodium nitrite solution. The temperature usually is maintained within a range of 3 to 5° C. In general, addition of sodium nitrite is stopped when diazotisation is complete (which can be detected e.g. with the help of starch iodide paper).

The diazonium slurry, optionally comprising a surfactant, and a 2-hydroxy-3-naphthoic acid solution, optionally comprising a resin and optionally a surfactant and obtainable e.g. in mixing 2-hydroxy-3-naphthoic acid, an aqueous solution of sodium hydroxide and optionally 2-hydroxynaphthalene, are added simultaneously to water having a temperature in the range of preferably 1 to 5° C. such that the pH usually remains in the range of from 9 to 12. In general, pH control is via addition of dilute sodium hydroxide solution. Preferably, the temperature is maintained at 3 to 10° C. by addition of ice. Usually, the coupling reaction is carried out for 45 to 90 minutes.

Generally, the orange pigment slurry thus obtained is stirred for 10 to 30 minutes. As a rule, an aqueous solution of a magnesium, calcium, strontium, barium or manganese salt is added to the slurry. However, the laking also can be carried out by adding the aqueous salt solution or a part of it during the diazotisation step. The slurry preferably is then heated to a temperature in the range of from 50 to 90° C. and the pH usually is adjusted to 6 to 8 with preferably a dilute acid such as hydrochloride acid.

The pigment of the invention may be isolated by filtration from the reaction mixture when coupling and laking are completed. The filtered product can be washed with water to remove soluble salts. The pigment may be dried and powdered by sieving, ball-milling, grinding or other known methods.

Another embodiment of the present invention is related to the use of the inventive pigment composition for the preparation of coloring high molecular weight organic materials, preferably biopolymers, plastic materials, glasses, ceramic products, for formulations in decorative cosmetics, for the preparation of inks, preferably printing inks, gravure inks, offset inks, screen printing inks, security inks, stationary inks, coating inks, jet-inks, inks for stamp pads, inks for impact printing ribbons, inks for packaging printing; paint systems, in particular automotive lacquers, preferably on the base of high solid, waterborne, metallic paints, industrial paints, trade sales paints, coil coating and powder coating; non-impact printing material preferably for thermal wax transfer, ink-jet printing, thermal dye diffusion transfer; colored polymer particles preferably for color toners, particularly preferred for dry copy toners, such as smashed-type dry toners and polymerized-type dry toners, liquid copy toners, electrographic toners, preferably wet toners for electrophotography; color filters, preferably for the preparation of liquid crystal displays and charge combined devices; colored photoresists, photo- and electroconductive polymers, photocell aggregates, dispersion colors, in the biomedical field of application, for solar energy and collecting systems, for coloring porous substrates and photo/repro in general.

In a preferred embodiment of this invention the inventive pigment compositions are used as powder pigments, in the form of pigment preparations, master-batches and dry color.

Further, preferred embodiments concern the use for the preparation of inks such as printing inks, gravure inks, offset inks, screen printing inks, flexo, security printing inks, coating inks, or jet-inks; inks for stationary, inks for stamp pads, inks for impact printing ribbons, and packaging printing; paints such as automobile paints preferably on the base of high solid, waterborne, metallic paints, industrial paints, trade sales paints, coil coating, powder coating, plastics, especially for laminations, fibres, sheet, and molded articles, non-impact printing material, e.g. for thermal wax transfer, ink-jet printing, thermal dye diffusion transfer, colored polymer particles, especially dry copy toners, liquid copy toners, electrographic toners (i.e. charge generating and transport materials), as well as master batches for plastic coloration, master batches for toner coloration, color toners, color filters, preferably for the preparation of liquid crystal displays (LCD) and charge combined devices (CCD), cosmetics, in the biomedical field, for solar energy and collecting systems, and for coloring porous substrates.

Illustrative examples of suitable organic materials of high molecular weight (having a molecular weight usually in the range of from $10^3$ to $10^7$ g/mol) which can be colored with the pigment compositions of this invention are vinyl polymers, for example polystyrene, poly-α-methylstyrene, poly-p-methylstyrene, poly-p-hydroxystyrene, poly-p-hydroxy-phenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers which are derived from maleimide and/or maleic anhydride, such as copolymers of maleic anhydride with styrene; polyvinyl pyrrolidone; ABS; ASA; polyamides; polyimides; polyamidimides; polysulfones; polyether sulfones; polyphenylene oxides; polyurethanes; polyureas; polycarbonates; polyarylenes; polyarylene sulfides; polyepoxides; polyolefins such as polyethylene and polypropylene; polyalkadienes; biopolymers and the derivatives thereof e.g. cellulose, cellulose ethers and esters such as ethylcellulose, nitrocellulose, cellulose acetate and cellulose butyrate, starch, chitin, chitosan, gelatin, zein; natural resins; synthetic resins such as alkyd resins, acrylic resins, phenolic resins, epoxide resins, aminoformaldehyde resins such as urea/-formaldehyde resins and melamine/formaldehyde resin; vulcanized rubber; casein; silicone and silicone resins; rubber, chlorinated rubber; and also polymers which are used, for example, as binders in paint systems, such as novolaks which are derived from $C_1$–$C_6$-aldehydes such as formaldehyde and acetaldehyde and a binuclear or mononuclear, preferably mononuclear, phenol which, if desired, is substituted by one or two $C_1$–$C_9$alkyl groups, one or two halogen atoms or one phenyl ring, such as o-, m- or p-cresol, xylene, p-tert-butylphenol, o-, m- or p-nonylphenol, p-chlorophenol or p-phenylphenol, or a compound having more than one phenolic group such as resorcinol, bis(4-hydroxyphenyl) methane or 2,2-bis(4-hydroxyphenyl)propane; as well as suitable mixtures of said materials.

Particularly preferred high molecular weight organic materials, in particular for the preparation of a paint system, a printing ink or ink, are, for example, cellulose ethers and esters, e.g. ethylcellulose, nitrocellulose, cellulose acetate and cellulose butyrate, natural resins or synthetic resins (polymerization or condensation resins) such as aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyester, ABS, ASA, polyphenylene oxides, vulcanized rubber, casein, silicone and silicone resins as well as their possible mixtures with one another.

It is also possible to use high molecular weight organic materials in dissolved form as film formers, for example boiled linseed oil, nitrocellulose, alkyd resins, phenolic resins, melamine/formaldehyde and urea/formaldehyde resins as well as acrylic resins.

Said high molecular weight organic compounds may be obtained singly or in admixture, for example in the form of granules, plastic materials, melts or in the form of solutions, in particular for the preparation of spinning solutions, paint systems, coating materials, inks or printing inks.

In a particularly preferred embodiment of this invention, the novel pigment compositions are used for the mass coloration of polyvinyl chloride, polyamides and, especially, polyolefins such as polyethylene and polypropylene as well as for the preparation of paint systems, including powder coatings, inks, particularly printing inks, stationary inks, coating inks, jet-inks, color filters, toners, particularly electrophotographic toners, and coating colors.

Illustrative examples of preferred binders for paint systems are alkyd/melamine resin paints, acryl/melamine resin paints, cellulose acetate/cellulose butyrate paints and two-pack system lacquers based on acrylic resins which are crosslinkable with polyisocyanate.

According to observations made to date, the novel pigment compositions can be added in any desired amount to the material to be colored, depending on the end use requirements. In the case of high molecular weight organic materials, for example, the pigments composition according to this invention can be used in an amount in the range from 0.01 to 40, preferably from 0.1 to 20% by weight, based on the total weight of the colored high molecular weight organic material.

Hence, another embodiment of the present invention relates to a composition comprising of (a) 0.01 to 40, preferably 0.1 to 20% by weight, based on the total weight of the colored high molecular organic material, of a pigment composition according to the present invention, and (b) 99.99 to 60, preferably 99.9 to 80% by weight, based on the total weight of the colored high molecular organic material, of a high molecular organic material, and (c) if desired, customary additives such as rheology improvers, dispersants, fillers, paint auxiliaries, siccatives, plasticizers, UV-stabilizers, and/or additional pigments or corresponding precursors in effective amounts, such as e.g. from 0 to 50% b.w., based on the total weight of (a) and (b).

The pigmenting of the high molecular weight organic materials with the novel pigment compositions is usually effected by incorporating said novel pigment compositions, if desired in the form of masterbatches, in the high molecular weight organic materials using customary apparatus suitable to this end, such as extruders, roll mills, mixing or milling apparatus. The material thus treated is then normally brought into the desired final form by methods which are known per se, such as calandering, moulding, extrusion moulding, coating, casting, extruding, by injection moulding.

To produce non-brittle mouldings or to diminish their brittleness, so-called plasticizers can be added to the high molecular weight substances prior to moulding. Plasticizers may be, for example, esters of phosphoric acid, phthalic acid and sebacic acid. Said plasticizers may be added before, during or after pigmenting the high molecular weight substances with the pigment compositions of this invention.

To obtain different shades, the novel pigment compositions may advantageously be used in admixture with fillers, transparent and opaque white, colored and/or black pigments as well as customary luster pigments in the desired amount.

For the preparation of paints systems, coating materials, color filters, toners, preferably electrophotographic toners, inks, particularly stationary inks, coating inks, printing inks, and jet-inks, the corresponding high molecular weight organic substances, such as binders, synthetic resin dispersions etc. and the novel pigment compositions are usually dispersed or dissolved together, if desired together with customary additives such as dispersants, fillers, paint auxiliaries, siccatives, plasticizers and/or additional pigments or pigment precursors, in a common solvent or mixture of solvents. This can be achieved by dispersing or dissolving the individual components by themselves, or also several components together, and only then bringing all components together, or by adding everything together at once. Hence, a further embodiment of the present invention relates to the use of the inventive pigment compositions for the preparation of dispersions and the corresponding dispersions, and paint systems, coating materials, color filters, inks, particularly printing inks such as thermal transfer-type printing inks, stationary inks, coating inks, jet-inks, toners, particularly toners for electrophotography such as smashed-type dry toners, polymerized-type dry toners, wet toners, comprising the inventive pigment compositions.

For application in printing, all customary industrial printing processes can be employed, such as screen printing, rotogravure, bronze printing, flexographic printing and offset printing.

Methods for the preparation of color filters, toners, inks, plastic applications, colored polymer particles and paints are well-known in the art.

E.g. GB-A 2,182,165 describes the preparation of a color filter by sequential application of the red, blue and green pigments to a suitable substrate such as an amorphous silicon thin film transistor. In order to obtain arrays of small dots of the three pigments over the surface of the substrate it is convenient to employ a photolithographic technique whereby each pigment is deposited on a photoetched polymer surface and the pigment and polymer are removed from the un-irradiated areas by washing with a solvent. In general the methods are known as dyeing methods, color resist methods, electron deposition methods and printing methods. E.g. a pigment dispersion can be employed for color resist method, and kneading process using sand-mill or ball-mill can be applied to get the (micronized) pigment dispersion (see for example JP 4-37987 and JP 4-39041). Another source which describes the preparation of color filters is given in U.S. Pat. No. 5,624,467.

An ink-jet printing ink can be prepared by mixing a pigment, a binder, water, an alcohol and additives. As binder polymers based on acrylate or methacrylate are preferred, particularly preferred are copolymers based on MMA/S, MMA/BA, ethylene-vinyl acetate, ethylene-vinyl acetate (partially hydrolyzed), ethylene-acrylate, ethylene-acrylic acid or combinations thereof. In the instant case, the addition of a base is also preferred to increase the amount of solved polymer if water is used. Any kinds of base can be used and preferably water-soluble amines or sodium and potassium hydroxides are used. Usually the particle size of the pigment in ink-jet printing ink should be small and therefore, it is highly desired to disperse the above mixture by a skandex, a paint-shaker, or any kinds of a dispersing machine (see e.g. U.S. Pat. No. 4,597,794, EP-A 425,439 or U.S. Pat. No. 5,085,698).

Methods for the preparation of inks for thermal ink transfer recording are known e.g. from U.S. Pat. No. 4,510, 206 or EP-A 708,710. E.g. a dispersion comprising the inventive pigment composition and a solvent like toluene can be used to produce layers or an ink sheet for thermal ink transfer.

For the preparation of a liquid toner the inventive pigment composition usually is dispersed in an organic solvent and is added into an aqueous surfactant solution while stirring. In general, the particle size of the toner is controlled by the stirring rate. After removing the organic solvent, e.g. by heating or evaporation, the solvent is changed from surfactant solution to the desirable solvent yielding the desired liquid toner.

General methods for the preparation of toners are known e.g. U.S. Pat. Nos. 5,130,220, 5,354,639 (suspension polymerization), U.S. Pat. Nos. 4,233,388, 5,016,823 (by pulverization), EP-A 494,692, Tokkai-Hei-9-324134, U.S. Pat. No. 4,894,308 (electrophotographic toner).

The preparation of colored polymer particles (including toners) can be carried out e.g. according to the methods described in Tokkai-Hei-S-100486 (suspension polymerization) or U.S. Pat. No. 4,077,804 (in situ polymerization) or by interface polymerization. E.g. the inventive pigment compositions can be mixed with a monomer like styrene, yielding a dispersion, then the monomer usually is polymerized yielding the desired particles or toners. Colored polymer particles can be used in the fields of toners (electrophotography), immunological diagnosis, spacer etc.

The inventive pigment compositions can be admixed with various polymers such as flexible polyvinylchloride, polyethylene or polymethylmethacrylate in usual ways such as processing on a 2-roll mill. Tests carried out so far indicate that the inventive pigment compositions show excellent compatibility with the abovementioned polymers.

Hence, further embodiments of the instant invention relate to the use of the inventive pigment composition for the preparation of dispersions, paint systems, coating materials, color filters, inks, preferably printing inks, as well as color toners comprising the inventive pigment compositions.

The inventive compositions provide considerably higher gloss than is seen with current liquid inks such as Pigment Orange 34 (e.g. IRGALITE® Orange F2G). Further, the inventive inks exhibit a superior fluidity and some of them are chlorine-free.

EXAMPLES

Example 1

(a) 2-amino-4-trifluoromethylbenzenesulphonic acid (24.2 g) is dissolved in a mixture of water (150 ml) and 47% aqueous sodium hydroxide solution (10.1 g). The solution thus obtained is cooled to 0° C. by addition of ice. The bulk of a solution of sodium nitrite (8.4 g) in water (25 ml) is added. A 36–38% hydrochloric acid solution (22.9 g) is added with ice cooling to give a slurry. The diazotisation reaction is then continued by dropwise addition of the remainder of the sodium nitrite solution over 35 minutes. The temperature is maintained within a range of 3 to 5° C. Addition of sodium nitrite is stopped when diazotisation is complete (shown by no oxidant present to starch iodide paper).

(b) A second vessel containing a mixture of water (150 ml), 47% aqueous solution of sodium hydroxide (10.1 g), 2-hydroxynaphthalene (0.8 g) and 2-hydroxy-3-naphthoic acid (18.2 g) is stirred until dissolved and gradually cooled to 8 to 10° C. with ice.

(c) A third vessel containing a mixture of water (70 ml) and 47% aqueous sodium hydroxide solution (5.8 g) is heated to 80° C. BEVIROS® 95 (a tall oil resin manufactured by Bergvik Kemi AB) (4.45 g) is added and stirred until dissolved. This is added to the second vessel just prior to coupling.

(d) Into a fourth vessel is added water (250 ml) at 3° C. The diazonium slurry obtained in step (a) and the rosin/2-hydroxy-3-naphthoic acid solution obtained in step (b) are then added simultaneously to this vessel such that the pH remains in the range of from 10.4 to 10.6. Once the addition of the rosin/2-hydroxy-3-naphthoic acid solution is complete, pH control is via addition of dilute sodium hydroxide solution. The temperature is maintained at 5 to 8° C. by addition of ice. The coupling reaction is carried out for 1 hour. The orange pigment slurry thus obtained is stirred for 15 minutes. A 80% by weight solution of calcium chloride (17.2 g) in 100 ml water is added. The slurry is then heated to 70° C. and the pH is adjusted to 7.2 with dilute hydrochloric acid, then filtered, afterwards washed with water and dried at 70° C. for 15 hours. Thereafter, the product is further heated for 4 hours at 90° C. The resulting dried pigment is sieved through a 250 μm screen to give a powdered pigment composition.

Example 2

As example 1, except 2-amino-4-trifluoromethylbenzenesulphonic acid (23.0 g) and orthanilic acid (0.9 g) are added to the diazotisation vessel.

Example 3

As example 1, except the composition of the resin vessel is as follows: BEVIROS® 95 (8.9 g), 47% aqueous sodium hydroxide solution (3.5 g) and water (140 ml).

Example 4

As example 1, except 2-amino-4-trifluoromethylbenzenesulphonic acid (23.9 g) and 2-amino-4-chloro-5-methylbenzenesulphonic acid (0.3 g) are added to the diazotisation vessel.

Example 5

(a) 2-amino-4-trifluoromethylbenzenesulphonic acid (24.2 g) is dissolved in a mixture of water (150 ml), ARQUAD® T50 (tallow trimethyl ammonium chloride manufactured by Akzo Chemie) (0.9 g) and 47% aqueous sodium hydroxide solution (10.0 g). The solution thus obtained is cooled to 0° C. by addition of ice. The bulk of a solution of sodium nitrite (8.4 g) in water (25 ml) is added. A 36–38% hydrochloric acid solution (22.9 g) is added with ice cooling to give a slurry. The diazotisation reaction is then continued by dropwise addition of the remainder of the sodium nitrite solution over 35 minutes. The temperature is maintained within a range of 3 to 5° C. Addition of sodium nitrite is stopped when diazotisation is complete (as shown by no oxidant present to starch iodide paper).

(b) A second vessel containing a mixture of water (300 ml), 47% aqueous solution of sodium hydroxide (10.1 g), 2-hydroxynaphthalene (0.8 g) and 2-hydroxy-3-naphthoic acid (18.2 g) is stirred until dissolved and gradually cooled to 8 to 10° C. with ice.

(c) A third vessel containing a mixture of water (100 ml) and 47% aqueous sodium hydroxide solution (1.75 g) is heated to 80° C. PORTGUESE® WW rosin (a gum rosin manufactured by Langley Smith and Co.) (4.4 g) is added and stirred until dissolved. This is added to the second vessel just prior to coupling.

(d) The diazonium slurry obtained in step (a) is added to the rosin/2-hydroxy-3-naphthoic acid solution vessel. The pH is maintained within the range of from 10.4 to 10.6 via addition of dilute sodium hydroxide solution. The temperature is maintained at 5 to 8° C. by addition of ice. The coupling reaction is carried out for 70 minutes. The orange pigment slurry thus obtained is stirred for 60 minutes. A 80% by weight solution of calcium chloride (17.2 g) in 100 ml water is added. The slurry is then heated to 70° C. and the pH is adjusted to 7.2 with dilute hydrochloric acid, then filtered, afterwards washed with water and dried at 70° C. for 15 hours. Thereafter, the product is further heated for 4 hours at 90° C. The resulting dried pigment is sieved through a 250 μm screen to give a powdered pigment composition.

Example 6

(a) 2-amino-4-trifluoromethylbenzenesulphonic acid (24.2 g) is dissolved in a mixture of water (150 ml), ARQUAD® T50 (tallow trimethyl ammonium chloride manufactured by Akzo Chemie) (0.9 g) and 47% aqueous sodium hydroxide solution (10.0 g). The solution thus obtained is cooled to 0° C. by addition of ice. The bulk of a solution of sodium nitrite (8.4 g) in water (25 ml) is added. A 36–38% hydrochloric acid solution (23.0 g) is added with ice cooling to give a slurry. The diazotisation reaction is then continued by dropwise addition of the remainder of the sodium nitrite solution over 35 minutes. The temperature is maintained within a range of 3 to 5° C. Addition of sodium nitrite is stopped when diazotisation is complete (as shown by no oxidant present to starch iodide paper). A 80% by weight solution of calcium chloride (17.2 g) in 100 ml water is added.

(b) A second vessel containing a mixture of water (300 ml), 47% aqueous solution of sodium hydroxide (10.1 g), 2-hydroxy-3-naphthoic acid (19.2 g) is stirred until dissolved and gradually cooled to 8 to 10° C. with ice.

(c) A third vessel containing a mixture of water (100 ml) and 47% aqueous sodium hydroxide solution (1.78 g) is heated to 80° C. BEVIROS® 95 (4.4 g) is added and stirred until dissolved. This is added to the second vessel just prior to coupling.

(d) The diazonium slurry obtained in step (a) is added to the rosin/2-hydroxy-3-naphthoic acid solution vessel. The pH is maintained within the range of from 10.4 to 10.6 via addition of dilute sodium hydroxide solution. The temperature is maintained at 5 to 8° C. by addition of ice. The coupling reaction is carried out for 60 minutes. The orange pigment slurry thus obtained is stirred for 60 minutes. The slurry is then heated to 70° C. and the pH is adjusted to 7.2 with dilute hydrochloric acid, then filtered, afterwards washed with water and dried at 70° C. for 15 hours. Thereafter, the product is further heated for 4 hours at 90° C. The resulting dried pigment is sieved through a 250 μm screen to give a powdered pigment composition.

Example 7

(a) 2-amino-4-trifluoromethylbenzenesulphonic acid (24.2 g) is dissolved in a mixture of water (150 ml), ARQUAD® T50 (0.9 g) and 47% aqueous sodium hydroxide solution (10.0 g). The solution thus obtained is cooled to 0° C. by addition of ice. The bulk of a solution of sodium nitrite (8.4 g) in water (25 ml) is added. A 36–38% hydrochloric acid solution (23.0 g) is added with ice cooling to give a slurry. The diazotisation reaction is then continued by dropwise addition of the remainder of the sodium nitrite solution over 35 minutes. The temperature is maintained within a range of 3 to 5° C. Addition of sodium nitrite is stopped when diazotisation is complete (as shown by no oxidant present to starch iodide paper). A 80% by weight solution of calcium chloride (17.2 g) in 100 ml water is added.

(b) A second vessel containing a mixture of water (300 ml), 47% aqueous solution of sodium hydroxide (10.1 g), 2-hydroxy-3-naphthoic acid (19.2 g) is stirred until dissolved and gradually cooled to 8 to 10° C. with ice.

(c) A third vessel containing a mixture of water (100 ml) and 47% aqueous sodium hydroxide solution (1.78 g) is heated to 80° C. BEVIROS® 95 (4.4 g) is added and stirred until dissolved. This is added to the second vessel just prior to coupling.

(d) Into a fourth vessel 250 ml of water of 3° C. are added. The diazonium slurry obtained in step (a) and the rosin/2-hydroxy-3-naphthoic acid solution are then added simultaneously to this vessel such that the pH remains in the range of from 10.4 to 10.6. Once addition of rosin/2-hydroxy-3-naphthoic acid solution is complete, pH control is via addition of dilute sodium hydroxide solution. The temperature is maintained at 5 to 8° C. by addition of ice.

The coupling reaction is carried out for 45 minutes. The orange pigment slurry thus obtained is stirred for 40 minutes. A solution of 80% by weight of calcium chloride (12.5 g) dissolved in 100 ml water is added. The slurry is then heated to 70° C. and the pH is adjusted to 7.2 with dilute hydrochloric acid, then filtered, afterwards washed with water and dried at 70° C. for 15 hours. Thereafter, the product is further heated for 4 hours at 90° C. The resulting dried pigment is sieved through a 250 μm screen to give a powdered pigment composition.

Examples 8 to 14

Printing inks are prepared by dispersing the pigment compositions obtained in examples 1 to 7 in an alcohol/nitrocellulose ink vehicle via a 16 hour ballmill: A millbase is prepared by ball-milling 18% of the appropriate pigment composition and 82% of the ballmill medium for 16 hours. The ballmill medium consists of 49% nitrocellulose medium and 51% ethanol. After ball-milling is complete the millbase is reduced by addition of 50% by millbase weight of a reducing medium consisting of 24% maleic resin, 24% ethoxypropanol, 36% of nitrocellulose medium and 16% ethanol.

These are compared with ink made in an identical manner using a current pigment for liquid packaging ink (comprising IRGALITE® Orange F2G from Ciba Specialty Chemicals, Pigment Orange 34). The results are given below. The percentage of pigment composition in the ink vehicle is chosen as 9% by weight.

Gloss is measured visually using the following scale: 1=very slight increase, 2=slight increase, 3=slight-moderate increase, 4=moderate increase, 5=moderate-severe increase. Flow is measured as the time taken to pass through a number 3 Zahn cup. The results quoted below are expressed as a percentage of the time taken for IRGALITE® Orange F2G to flow through the cup.

TABLE

| Example | Flow [%] | Gloss |
|---------|----------|-------|
| 1 | 40 | 2 |
| 2 | 53 | 4 |
| 3 | 57 | 4 |
| 4 | 40 | 3 |
| 5 | 40 | — |
| 6 | 60 | 3 |
| 7 | 55 | 5 |

What is claimed is:

1. A printing ink composition having a tinctorially effective amount of a solution comprising (a) from 80 to 99.9% by weight of an azo pigment I

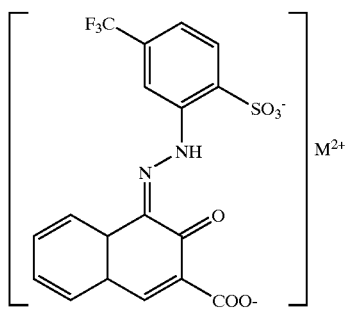

where M is Mg, Ca, Sr, Ba, or Mn or a mixture thereof, (b) from 0 to 20% by weight of an azo pigment II

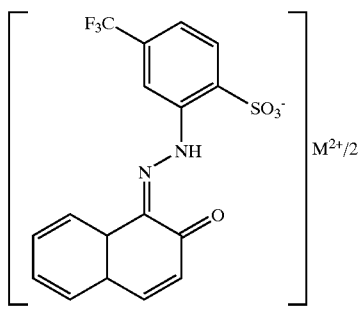

(c) from 0 to 20% by weight of an azo pigment III

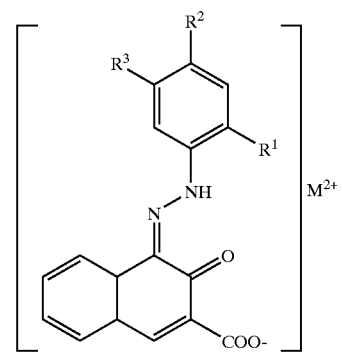

where $R^1$, $R^2$ and $R^3$ independently from each other stand for hydrogen, $C_1$–$C_{20}$-alkyl, $C_5$–$C_{20}$-alkoxy, $C_2$–$C_{20}$-alkenyl, $C_1$–$C_{20}$-alkylthiol, $C_1$–$C_{20}$-alkoxycarbonyl, hydroxy-$C_1$–$C_4$-alkoxy, phenyl, benzyl, phenylthio, halogen, cyano, nitro, —$CF_3$, —$COR^4$, —$COOR^5$, —$CONR^4R^5$, —$SO_2R^4$, —$SO_3R^4$, —$SO_2NR^4R^5$, —$NR^4R^5$ or —$OR^4$, with the proviso, that when in formula III $R^2$ stands for hydrogen and $R^3$ is $CF_3$, then $R^1$ is not —$SO_3^-$, and wherein $R^4$ and $R^5$ independently from each other stand for, $C_1$–$C_4$-alkyl or phenyl, with the proviso, that at least one of the groups $R^1$, $R^2$ or $R^3$ is not hydrogen, (d) from 0 to 20% by weight of an azo pigment IV

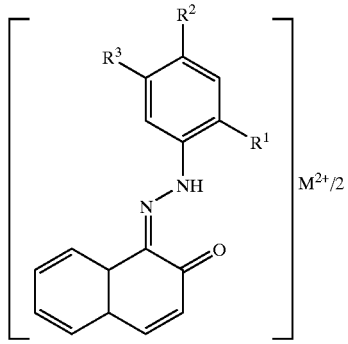

(e) from 0 to 20, based on the sum of the amounts of components (a) to (d), of a surfactant, (f) from 0.1 to 50% by weight, based on the sum of the amounts of components (a) to (d), of a resin selected from the group consisting of tall oil resin, gum rosin, wood rosin, hydrogenated rosin, rosin ester, disproportionated rosin, dimerised rosin, polymerised rosin, phenolic rosin and carboxyl containing maleic and fumaric resin.

2. A composition according to claim 1 wherein $R^1$ in formula III component (c) is —COOH or —$SO_3$.

3. A composition according to claim 1 wherein component (e) is present in an amount from 0.1 to 20% by weight, based on the sum of the amounts of components (a) to (d).

4. Process for the preparation of the printing ink composition according to claim 1, comprising laking, with a magnesium, calcium, strontium, barium or maganese salt or a mixture of two or more of such salts, (a) an azo dyestuff obtained by coupling a diazonium salt of an amine of formula VI

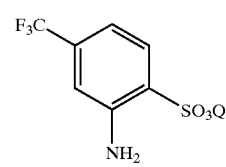

where Q is hydrogen, an alkali metal or ammonium, or (b) a mixture of azo dyestuffs obtained by coupling a mixture of the diazonium salt VI and a diazonium salt VII

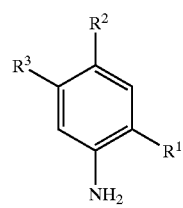

with 2-hydroxy-3-naphthoic acid (BONA) or a mixture of BONA and 2-hydroxynaphthalene the resin being added before or after coupling to the coupling or diazotization solution.

5. A method of use comprising applying the printing ink composition according to claim 1 onto a substrate.

6. A color filter having at least one layer of a composition comprising (a) from 80 to 99.9% by weight of an azo pigment I

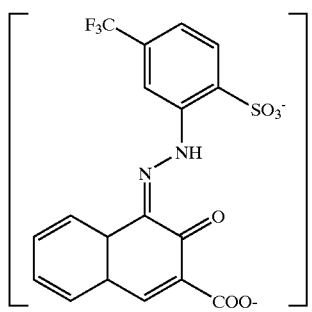

where M is Mg, Ca, Sr, Ba, or Mn or a mixture thereof, (b) from 0 to 20% by weight of an azo pigment II

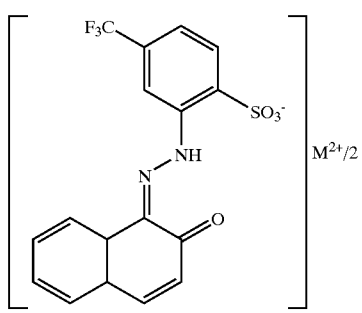

(c) from 0 to 20% by weight of an azo pigment III

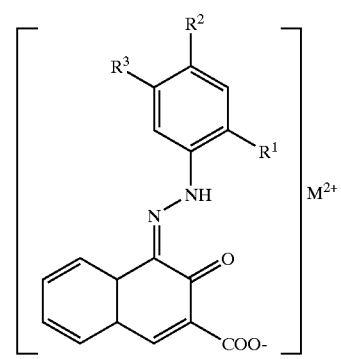

where $R^1$, $R^2$ and $R^3$ independently from each other stand for hydrogen, $C_1$–$C_{20}$-alkyl, $C_5$–$C_{20}$-alkoxy, $C_2$–$C_{20}$-alkenyl, $C_1$–$C_{20}$-alkylthiol, $C_1$–$C_{20}$-alkoxycarbonyl, hydroxy-$C_1$–$C_4$-alkoxy, phenyl, benzyl, phenylthio, halogen, cyano, nitro, —$CF_3$, —$COR^4$, —$COOR^5$, —$CONR^4R^5$, —$SO_2R^4$, —$SO_3R^4$, —$SO_2NR^4R^5$, —$NR^4R^3$ or —$OR^4$, with the proviso, that when in formula III $R^2$ stands for hydrogen and $R^3$ is $CF_3$, then $R^1$ is not —$SO_3^-$, and wherein $R^4$ and $R^5$ independently from each other stand for hydrogen, $C_1$–$C_4$-alkyl or phenyl, with the proviso, that at least one of the groups $R^1$, $R^2$ or $R^3$ is not hydrogen, (d) from 0 to 20% by weight of an azo pigment IV

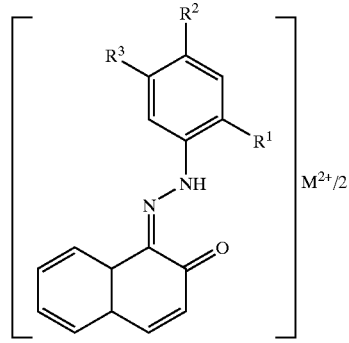

(e) from 0 to 20, based on the sum of the amounts of components (a) to (d), of a surfactant, (f) from 0.1 to 50% by weight, based on the sum of the amounts of components (a) to (d), of a resin selected from the group consisting of tall oil resin, gum rosin, wood rosin, hydrogenated rosin, rosin ester, disproportionated rosin, dimerised rosin, polymerised rosin, phenolic rosin and carboxyl containing maleic and fumaric resin.

7. A color filter according to claim 6 wherein $R^1$ in formula III component (c) is —COOH or —$SO_3$.

8. A color filter according to claim 6 wherein component (e) is present in an amount from 0.1 to 20% by weight, based on the sum of the amounts of components (a) to (d).

9. A method of use comprising applying at least one layer of a composition comprising (a) from 80 to 99.9% by weight of an azo pigment I

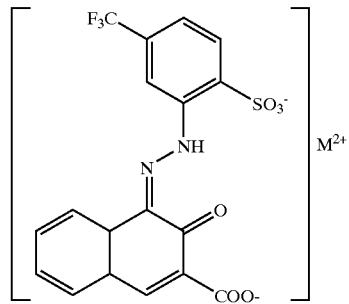

where M is Mg, Ca, Sr, Ba, or Mn or a mixture thereof, (b) from 0 to 20% by weight of an azo pigment II

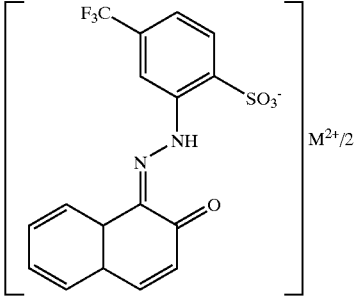

(c) from 0 to 20% by weight of an azo pigment III

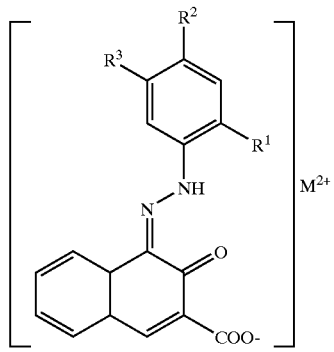

where $R^1$, $R^2$ and $R^3$ independently from each other stand for hydrogen, $C_1$–$C_{20}$-alkyl, $C_3$–$C_{20}$-alkoxy, $C_2$–$C_{20}$-alkenyl, $C_1$–$C_{20}$-alkylthiol, $C_1$–$C_{20}$-alkoxycarbonyl, hydroxy-$C_1$–$C_4$-alkoxy, phenyl, benzyl, phenylthio, halogen, cyano, nitro, —$CF_3$, $COR^4$, —$COOR^5$, —$CONR^4R^5$, —$SO_2R^4$, —$SO_3R^4$, —$SO_2NR^4R^5$, —$NR^4R^5$ or —$OR^4$, with the proviso, that when in formula III $R^2$ stands for hydrogen and $R^3$ is $CF_3$, then $R^1$ is not —$SO_3^-$, and wherein $R^4$ and $R^5$ independently from each other stand for hydrogen, $C_1$–$C_4$-alkyl or phenyl, with the proviso, that at least one of the groups $R^1$, $R^2$ or $R^3$ is not hydrogen, (d) from 0 to 20% by weight of an azo pigment IV

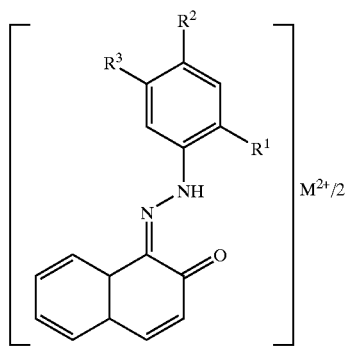

(e) from 0 to 20, based on the sum of the amounts of components (a) to (d), of a surfactant, (f) from 0.1 to 50% by weight, based on the sum of the amounts of components (a) to (d), of a resin selected from the group consisting of tall oil resin, gum rosin, wood rosin, hydrogenated rosin, rosin ester, disproportionated rosin, dimerised rosin, polymerised rosin, phenolic rosin and carboxyl containing maleic and fumaric resin onto a substrate.

10. A color toner comprising
(a) from 80 to 99.9% by weight of an azo pigment I

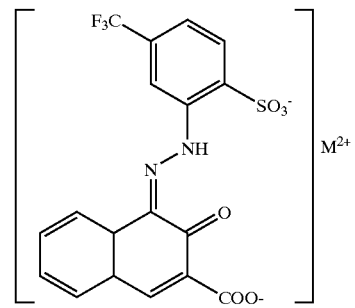

where M is Mg, Ca, Sr, Ba, or Mn or a mixture thereof,
(b) from 0 to 20% by weight of an azo pigment II

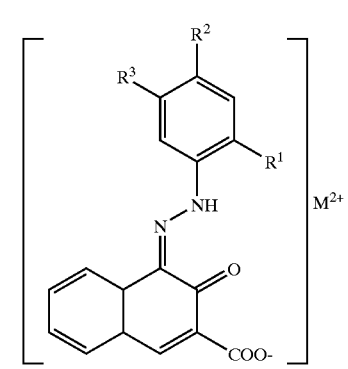

(c) from 0 to 20% by weight of an azo pigment III

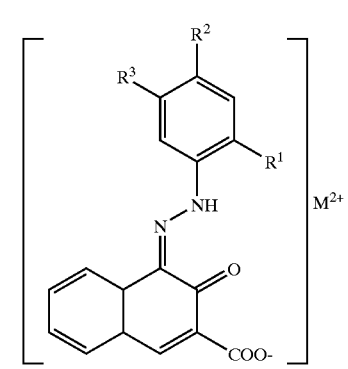

where $R^1$, $R^2$ and $R^3$ independently from each other stand for hydrogen, $C_1$–$C_{20}$-alkyl, alkoxy, $C_2$–$C_{20}$-alkenyl, $C_1$–$C_{20}$-alkylthiol, $C_1$–$C_{20}$-alkoxycarbonyl, hydroxy-$C_1$–$C_4$-alkoxy, phenyl, benzyl, phenylthio, halogen, cyano, nitro, —$CF_3$, —$COR^4$, —$COOR^5$, —$CONR^4R^5$, —$SO_2R^4$, —$SO_3R^4$, —$SO_2NR^4R^5$, —$NR^4R^5$ or —$OR^4$, with the proviso, that when in formula III $R^2$ stands for hydrogen and $R^3$ is $CF_3$, then $R^1$ is not —$SO_3^-$, and wherein $R^4$ and $R^5$ independently from each other stand for hydrogen, $C_1$–$C_4$-alkyl or phenyl, with the proviso, that at least one of the groups $R^1$, $R^2$ or $R^3$ is not hydrogen, (d) from 0 to 20% by weight of an azo pigment IV

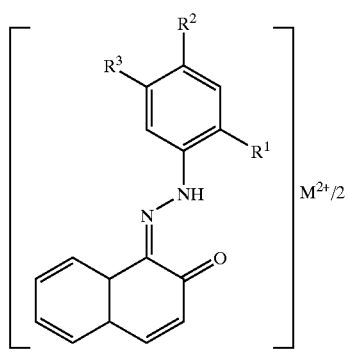

(e) from 0 to 20, based on the sum of the amounts of components (a) to (d), of a surfactant, (f) from 0.1 to 50% by weight, based on the sum of the amounts of components (a) to (d), of a resin selected from the group consisting of tall oil resin, gum rosin, wood rosin, hydrogenated rosin, rosin ester, disproportionated rosin, dimerised rosin, polymerised rosin, phenolic rosin and carboxyl containing maleic and fumaric resin.

11. A color toner according to claim 10 wherein $R^1$ in formula III component (c) is —COOH or —SO$_3$.

12. A color toner according to claim 10 wherein component (e) is present in an amount from 0.1 to 20% by weight, based on the sum of the amounts of components (a) to (d).

13. A method for preparing a liquid ink comprising blending a color toner according to claim 10 into a solution.

* * * * *

UNITED STATES PATENT AND TRADEMARK OFFICE
CERTIFICATE OF CORRECTION

PATENT NO. : 6,613,140 B2
DATED : September 2, 2003
INVENTOR(S) : Greig Chisholm et al.

It is certified that error appears in the above-identified patent and that said Letters Patent is hereby corrected as shown below:

<u>Title page,</u>
Item [30], should read:
-- [30]  Foreign Application Priority Data
    Sept.     (EP) ……………………..00810863.1 --.

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,613,140 B2
DATED        : September 2, 2003
INVENTOR(S)  : Greig Chisholm et al.

It is certified that error appears in the above-identified patent and that said Letters Patent is hereby corrected as shown below:

<u>Title page,</u>
Item [30], should read:
-- [30]    Foreign Application Priority Data
     September 21, 2000    (EP) ..........................00810863.1 --.

This certificate supersedes Certificate of Correction issued January 27, 2004.

Signed and Sealed this

Twenty-fourth Day of February, 2004

JON W. DUDAS
*Acting Director of the United States Patent and Trademark Office*